United States Patent [19]

Rogers et al.

[11] Patent Number: 4,545,125
[45] Date of Patent: Oct. 8, 1985

[54] EQUAL SPACING POSITIONING APPARATUS

[75] Inventors: William R. Rogers, Fremont; Duane B. Liescheidt, White Cloud, both of Mich.

[73] Assignee: Gerber Products Company, Fremont, Mich.

[21] Appl. No.: 565,435

[22] Filed: Dec. 27, 1983

[51] Int. Cl.$^4$ ............................................. G01M 3/00
[52] U.S. Cl. ..................................... 33/572; 33/192; 73/52
[58] Field of Search .................. 33/192, 174 L; 73/52

[56] References Cited

U.S. PATENT DOCUMENTS

| | | | |
|---|---|---|---|
| 61,926 | 2/1867 | Copeland | 33/192 |
| 3,802,252 | 4/1974 | Hayward et al. | |
| 3,832,885 | 9/1974 | Hayward et al. | 73/52 |
| 4,117,718 | 10/1978 | Hayward | 73/52 |
| 4,213,329 | 7/1980 | Raymond et al. | 73/52 |

*Primary Examiner*—William D. Martin, Jr.
*Attorney, Agent, or Firm*—Townsend and Townsend

[57] ABSTRACT

Apparatus for positioning a number of nondestructive dud detectors above a conveyor includes side support members to which a rotatable threaded positioning bar is mounted. The positioning bar includes a number of serially placed threaded positioning segments. The dud detectors are supported by the positioning bar through individual dud detector supports. Each dud detector support includes a threaded block which engages the threaded positioning bar. The threaded positioning segments have threads with different pitches. Rotation of the positioning bar cause the dud detectors to move axially along the positioning bar, and thus transversely over the conveyor belt, at unequal rates. The thread spacing or pitch for each threaded positioning segment is chosen so that the separation between adjacent dud detectors changes while keeping the dud detectors equally spaced. Since the detectors are always evenly spaced relative to one another, boxes of different sized containers passing beneath the dud detectors on the conveyor belt can be easily and quickly accommodated by simply positioning the first and last dud detectors over their respective containers. The interior dud detectors will automatically be aligned over the interior containers.

8 Claims, 9 Drawing Figures

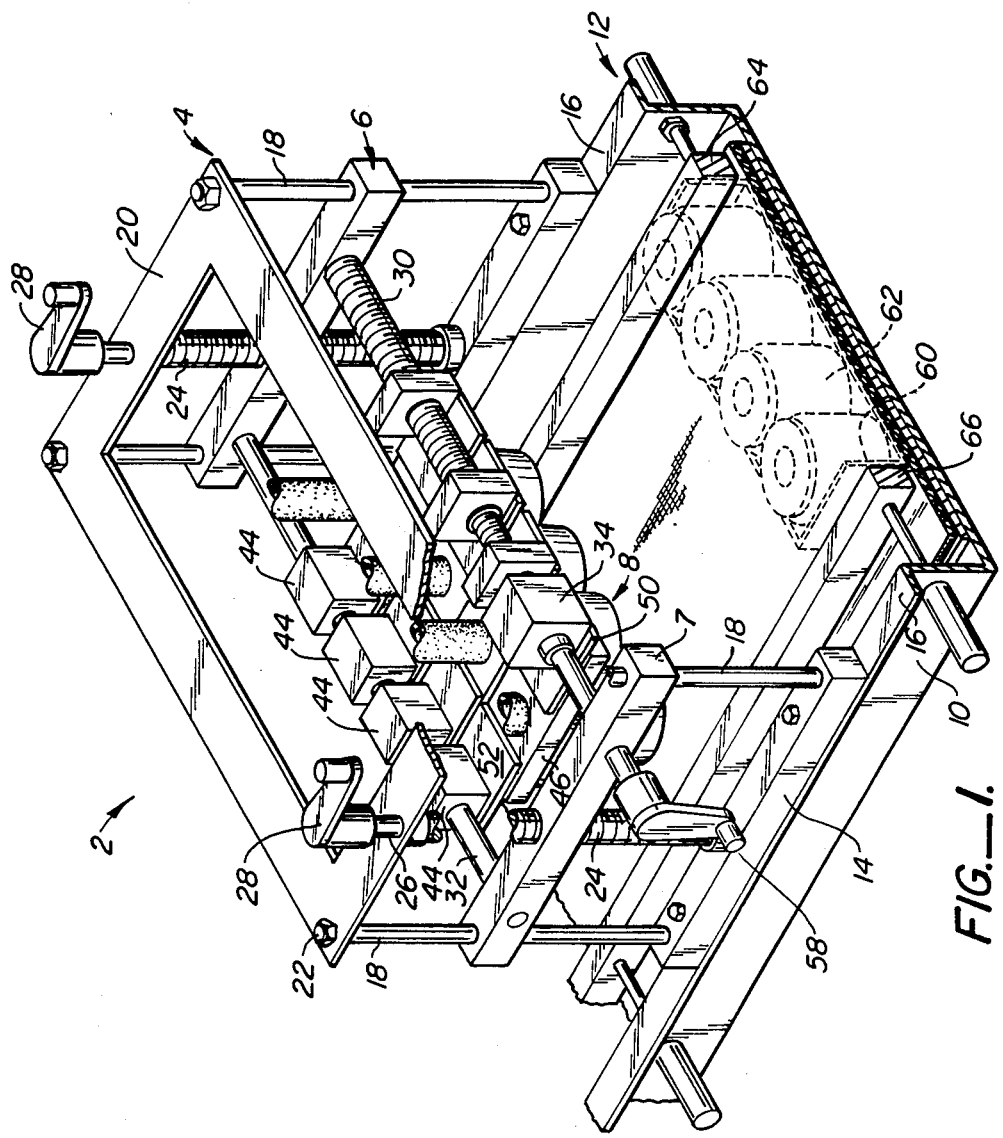
FIG._1.

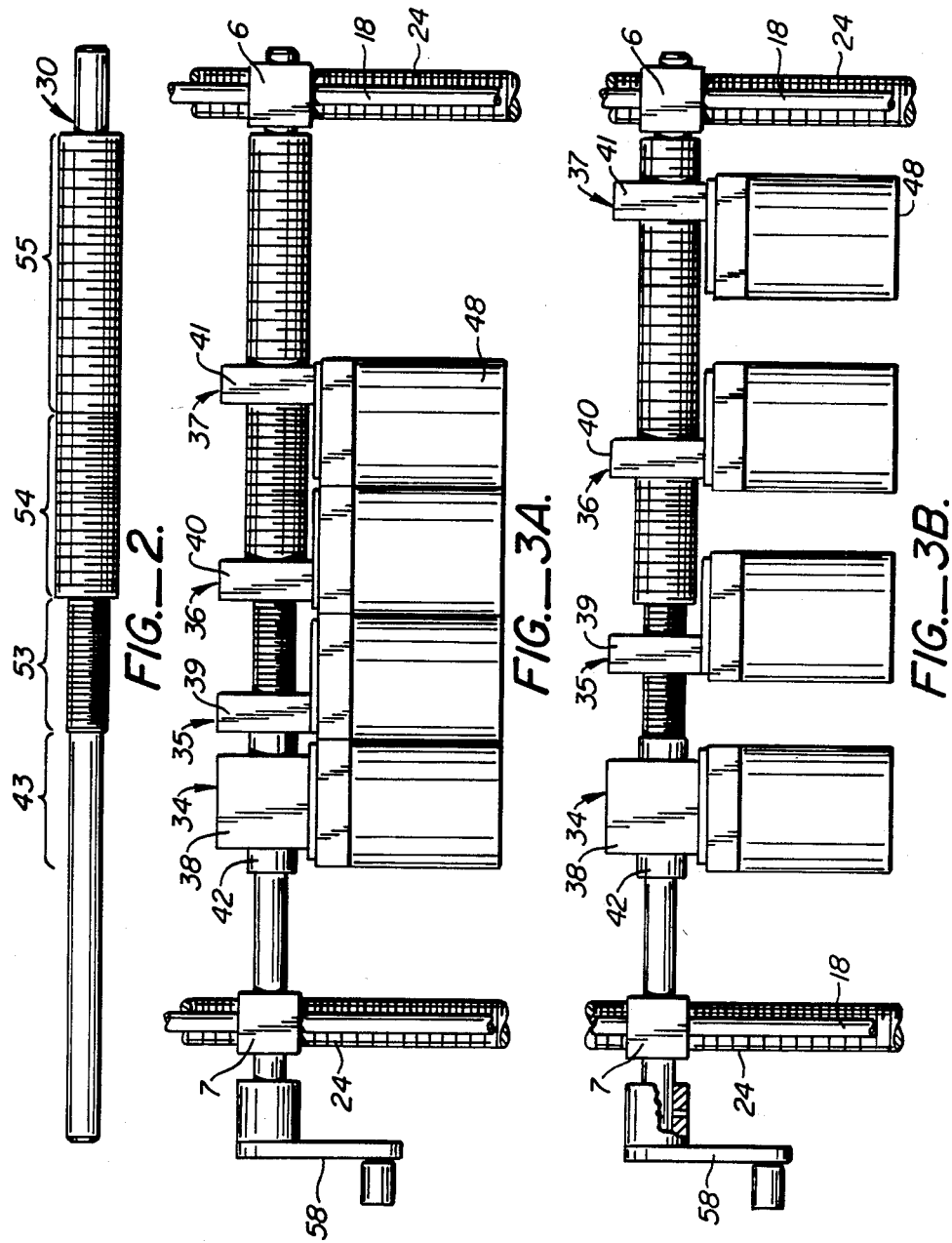

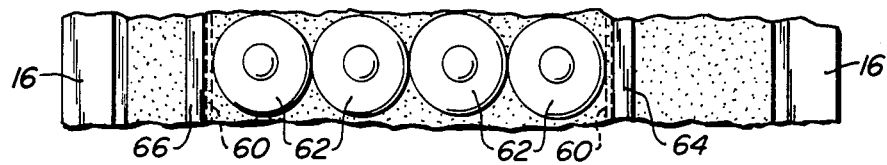
FIG._4A.
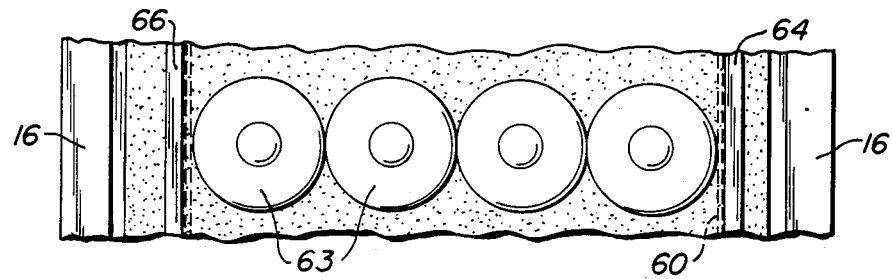
FIG._4B.
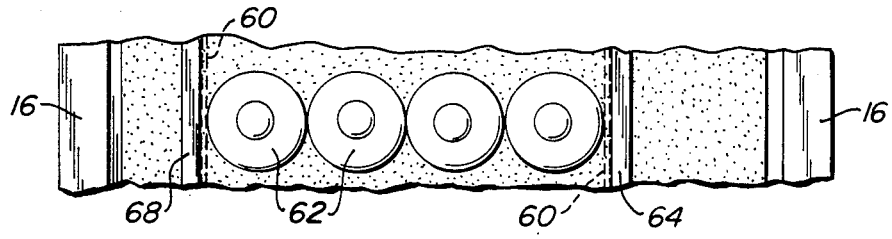
FIG._5A.
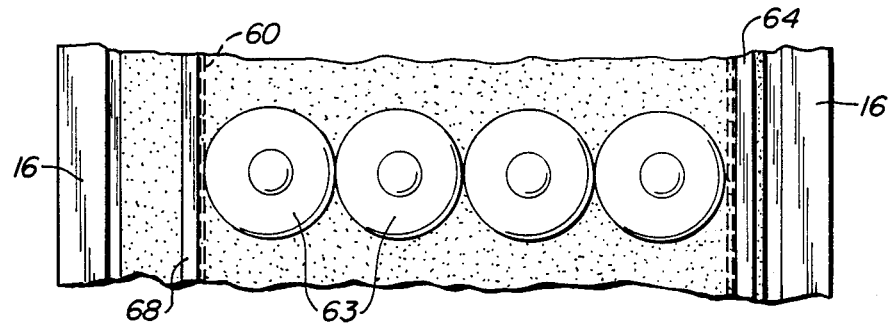
FIG._5B.
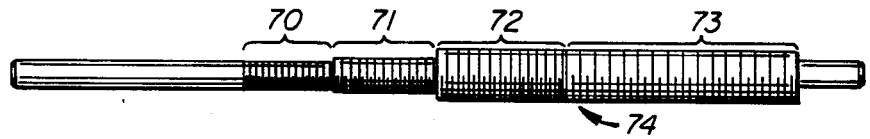
FIG._6.

EQUAL SPACING POSITIONING APPARATUS

BACKGROUND OF THE INVENTION

Certain products, such as baby food, are packaged under a partial vacuum in containers having a domed metal cap. These domed caps are concave when a proper vacuum is maintained in the container. If the vacuum is lost, the domed portion pops up to provide a visual indication of an improperly sealed container, commonly called a dud.

Because of the critical need for insuring that baby food containers are properly sealed, various types of nondestructive dud detecting apparatus have been developed. One type is positioned above a conveyor along which boxes of sealed containers pass. These dud detectors are used to sense the presence of the proper vacuum or pressure within the container in a variety of manners. See, for example, U.S. Pat. Nos. 3,802,252; 3,832,885; 4,213,329 and 4,117,718, all assigned Benthos Incorporated of North Falmouth, Mass. Since many of the currently available dud detectors can be used even though the containers are packaged in sealed cardboard boxes, testing can be conducted at any time, even immediately prior to shipping.

One way to conduct nondestructive testing of 100% of the containers is to have boxes of the containers fed along a conveyor. With this testing technique a number of dud detectors are positioned above the conveyor at positions directly overlying the containers within the passing boxes. Typically, a box of baby food jars will have four rows of jars packed adjacent one another; four dud detectors are arranged above the conveyor equally spaced from one another to directly overlie the rows of jars in the boxes as they pass underneath the detectors.

Although this system permits the inspection of all containers, containers having different diameters require that the dud detectors be repositioned to achieve the appropriate spacing. Repositioning using conventional mounting apparatus is a cumbersome and time-consuming process thus reducing flexibility in the use of the dud detector inspection equipment.

SUMMARY OF THE INVENTION

The present invention is, in its broadest terms, directed to apparatus for the simultaneous linear positioning and repositioning of a number of objects in unequal amounts so the interobject spacing remains equal for each adjacent object. Although the present invention will be described relative to the positioning of dud detectors, the invention can be used with other positionable objects as well.

The dud detector positioning apparatus of the invention includes side support members between which a rotatable threaded positioning bar is mounted. The positioning bar includes a number of serially placed threaded positioning segments. The dud detectors are supported by the positioning bar through individual dud detector supports. Each dud detector support includes a threaded block which engages the threaded positioning bar.

The threaded positioning segments have different thread spacings (pitches) so that rotation of the positioning bar causes the dud detector supports and dud detectors therewith to move axially along the positioning bar and transversely over and underlying conveyor belt. The thread spacing or pitch for each threaded positioning segment is chosen so that for each rotation of the positioning bar the dud detector supports move different amounts with the distances between the dud detectors, although changing, remain equal.

With the present invention the detectors are always evenly spaced relative to one another, therefore, different sized containers passing beneath the dud detectors on the conveyor belt can be easily and quickly accommodated by simply positioning the first and last dud detectors over their respective containers. The interior dud detectors, that is those between the first and last dud detectors, will automatically be aligned with the interior containers.

Other features and advantages of the present invention will appear from the following description from which the preferred embodiments have been set forth in detail in conjunction with the accompanying drawings.

BRIEF DESCRIPTION OF THE DRAWINGS

FIG. 1 is an isometric view of the dud detector positioner and support apparatus of the invention mounted above a conveyor.

FIG. 2 is a side view of the threaded positioning bar of FIG. 1.

FIGS. 3A and 3B illustrate the positions of the dud detector supports and dud detectors at a first, closely spaced position and a second, separated position.

FIGS. 4A and 4B are schematic top views showing the position on the conveyor for small and large containers and the movable edge guides for the embodiment of FIG. 1.

FIGS. 5A and 5B are views similar to that of FIGS. 4A and 4B but using the second positioning bar embodiment of FIG. 6 wherein each dud detector support is threadedly mounted to a threaded segment of the positioning bar and illustrating the use of a single movable edge guide.

FIG. 6 is a side view of an alternative threaded positioning bar.

DETAILED DESCRIPTION OF THE PREFERRED EMBODIMENTS

Referring now to FIG. 1, a dud detector positioner and support apparatus 2 includes broadly a frame 4 having a pair of side supports 6, 7 which support a dud detector support assembly 8 therebetween.

Frame 4 includes a pair of base members 14 which are bolted to the horizontal lips 16 of sidewalls 10 of a conveyor 12. Frame 4 also includes four vertical rods 18, which extend vertically upwardly from base member 14, and a top plate 20 mounted to the upper ends of rods 18 and secured thereto by nuts 22.

Side supports 6 are positioned vertically by a pair of threaded height adjuster rods 24 secured between base member 14 and top plate 20. The upper ends 26 of threaded rods 24 each has a handle 28 mounted to upper end 26. Rotation of handle 28 rotates threaded rod 24 causing side support 6 to move vertically. The ends of side supports 6 are guided by rods 18 to keep side supports 6 horizontal. Threaded rods 18 have the same pitch so that equal rotation of handles 28 will cause side support 6 to move equal distances above conveyor 12.

Referring now also to FIGS. 2, 3A and 3B, dud detector support assembly 8 includes a multiple threaded horizontal positioning bar 30 mounted between side support 6, 7, a horizontal support rod 32 mounted parallel to positioning rod 30 and between side support 6, 7, a stationary dud detector support 34 and three threaded dud detector supports 35, 36 and 37. Supports 34–37 are all mounted to and supported by positioning rod 30 and support rod 32.

Dud detector support 34 includes a support block 38 housing a sleeve 42 which fits over a non-threaded region 43 of threaded rod 30. Each dud detector support 34–37 includes a sliding support block 44 mounted for sliding movement along support rod 32, a main support plate 46 from which dud detectors 48 are suspended, and a pair of connecting plates 50, 52 securing main support plate 46 to support blocks 38–41 on one end and sliding support blocks 44 on the other.

Positioning rod 30 includes first, second and third threaded positioning segments 53–55, each having a different numbers of threads per inch. Threaded support blocks 39, 40 and 41 are formed with threads complementary to the threads for first, second and third positioning segments 53, 54 and 55. Positioning rod 30 is rotated by a handle 58 mounted to one end. The number of threads per unit length is chosen so that each revolution of positioning rod 30 causes dud detector supports 35–37, and thus dud detectors 48 therewith, to move different amounts so that dud detectors 48 remain equally spaced. In the embodiment of FIG. 3A, the dud detectors are shown in a closely spaced configuration. Rotating handle 58 a chosen number of times leaves stationary dud detector support 34 in the same position, since it is supported at nonthreaded region 43, but moves detector supports 35–37 varying amounts. For example, if dud detector support 35 is to move 1 cm, to keep dud detectors 48 equally spaced, support 36 must move 2 cm and support 37 must move 3 cm.

One way to achieve this is in the following manner. The number of threads per unit length for first threaded position segment 53 is chosen. The number of threads per unit length for second position segment 54 is equal to the number of threads per inch for the first segment divided by 2. The number of threads per unit length for third segment 55 is equal to the number for first segment 53 divided by 3. This can be expressed in the following manner.

$$N(k) = N(l) \div k,$$

Where:
N(l) equals the number of threads per unit length for the first threaded segment,
k equals the number of the threaded segment in question, and
N(k) equals the number of threads per unit length for threaded segment in question.

Thus, if first positioning segment is chosen to have 24 threads per length, second segment will have 12 threads per unit length and third segment will have 8 threads per unit length.

To properly position a cardboard carton 60 having four rows of containers 62, such as jars of baby food, conveyor 12 includes a pair of movable guides 64, 66 which are used to position the left most container 62, as viewed in FIG. 1 beneath the left most dud detector 48, which is supported by stationary dud detector support 34. Once this is accomplished, handle 58 is rotated until the dud detector 48 supported by the outermost support 37 overlies the outermost (right most) container 62. Since there are four rows of containers 62 and four detectors 48, the interior dud detector supports 35, 36 will automatically overlie the interior containers 62 without any individual adjustment. FIGS. 4A and 4B illustrate the placement of movable guides 64, 66 when different sized containers 62 are used. It should be noted that the center of the left most container, since it is situated beneath stationary dud detector support 34, is in the same position. This is achieved by adjusting the movable guide 66.

FIGS. 5A and 5B illustrate the position of movable guide 64 and a stationary guide 68 when all four of the dud detector supports are threadably engaged with threaded segments 70, 71, 72 and 73 of a positioning rod 74, illustrated in FIG. 6. In FIG. 5A small sized containers are shown positioned between movable guide 64 and a stationary guide 68. When using the large sized containers 63 shown in FIG. 5B, the position of movable guide 64 is adjusted to accommodate the larger size while stationary guide 68 remains in place. Dud detectors 48 are moved from their position overlying small container 62 to overlie large container 63 by rotating handle 58.

Other modifications and variations can be made to the disclosed embodiments without departing from the subject of the invention as defined in the following claims.

We claim:
1. A dud detector positioner for use with a plurality of non-destructive dud detectors of the type which are positioned above a series of containers moving along a conveyor belt, the positioner comprising:
a frame mounted above the conveyor belt including side support members;
a dud detector support assembly mounted between the side support members and overlying the conveyor belt, the support assembly including:
a horizontal positioning rod;
a plurality of dud detector supports configured to engage said positioning rods to be supported thereby, said dud detector supports adapted to support a dud detector;
said positioning rod having a plurality of serially arranged threaded positioning segments engaging complementary threaded portions of said dud detector supports;
said threaded positioning segments having threads according to the following:

$$N(k) = N(l) \div k,$$

where:
N(l) = the number of threads per unit length for the first threaded segment, and
N(k) = the number of the threads per unit length for the $k^{th}$ threaded segment; and
means for rotating said positioning rod thereby moving said dud detector supports and dud detector therewith in uneven amounts with said dud detectors remaining equally spaced.

2. The positioner of claim 2 wherein said dud detector support assembly includes a nonthreaded positioning region on said positioning rod and a corresponding non-threaded dud detector support arranged and adapted to remain stationary while said positioning rod rotates.

3. The positioner of claim 2 wherein said nonthreaded positioning support is adjacent said first threaded segment.

4. The positioner of claim 1 further comprising means for raising and lowering said side support members.

5. The positioner of claim 1 wherein said raising and lowering means includes a vertical threaded rod threadably engaging one said side support member and a handle mounted to an upper end of said vertical threaded rod for rotating said rod to raise and lower said one side support member.

6. The positioner of claim 5 further comprising first and second vertical threaded rods and handles.

7. The positioner of claim 1 wherein said horizontal positioning rod is arranged perpendicular to the direction of movement of the conveyor belt.

8. The positioner of claim 1 wherein said support assembly further comprises a support rod mounted between said side support members parallel to said positioning rod, and wherein said dud detector supports are adapted to slidably engage said support rod so upon operation of said rotating means said dud detector supports slide along said support rod.

* * * * *